Aug. 1, 1967  R. H. ANDRESEN  3,333,855
FLOATING CONTROLLED GAP SEAL
Filed Sept. 22, 1964  2 Sheets-Sheet 2

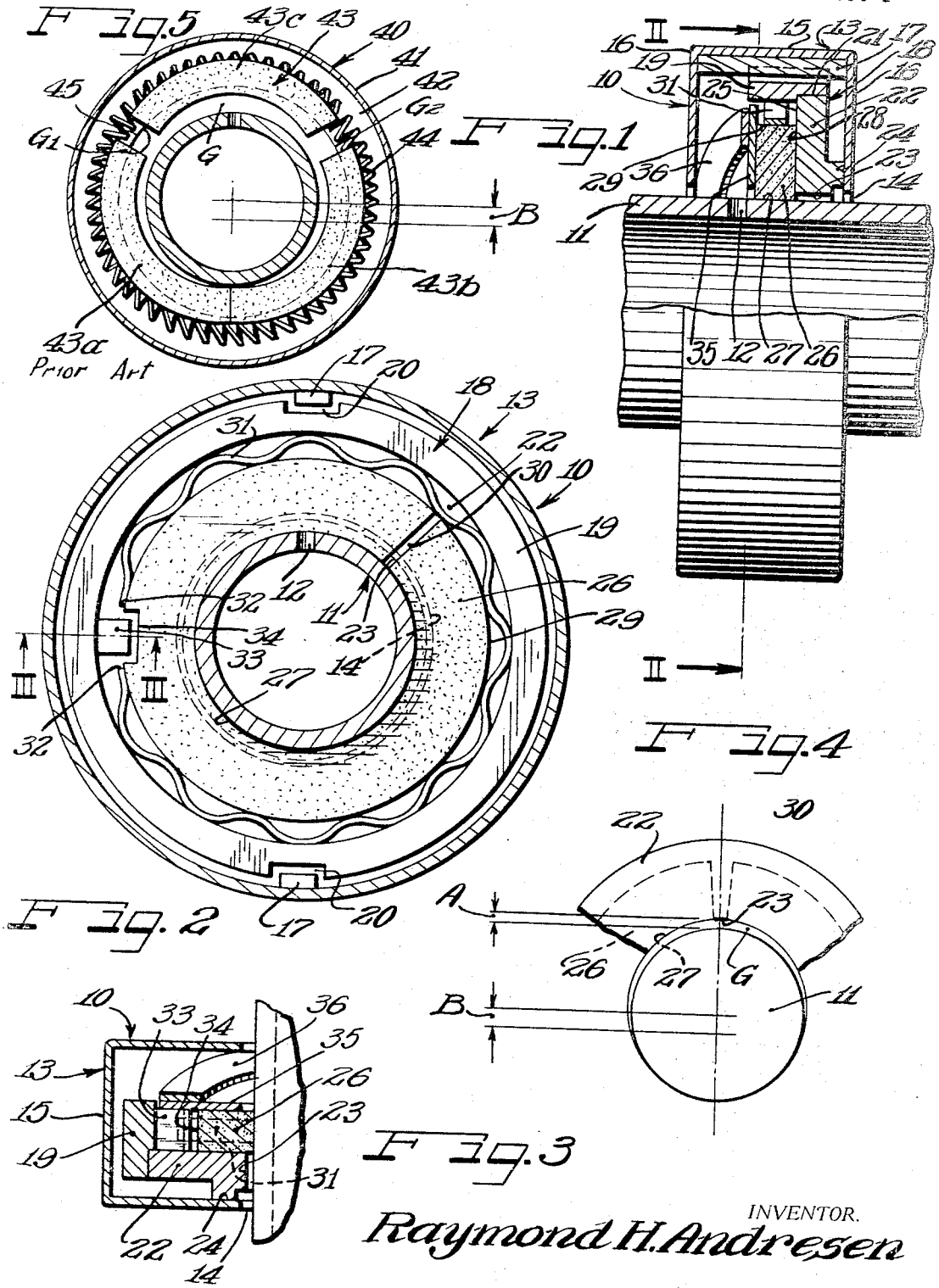

INVENTOR.
Raymond H. Andresen
BY
ATTORNEYS

United States Patent Office 3,333,855
Patented Aug. 1, 1967

3,333,855
FLOATING CONTROLLED GAP SEAL
Raymond H. Andresen, Barrington, Ill., assignor to Gits Bros. Mfg. Co., Chicago, Ill., a corporation of Illinois
Filed Sept. 22, 1964, Ser. No. 398,284
10 Claims. (Cl. 277—40)

This invention relates to circumferential seals which float in a supporting structure to accommodate eccentricities, runouts and misalignments of parts to be sealed without damage to the seal construction and without opening up leakage gaps. Specifically this invention relates to a circumferential shaft seal having a spring loaded contractible shaft embracing seal ring carried in a self-centering floating support accommodating shaft runouts without damage to the seal ring while at the same time dampening the tendency of the seal ring to open up leakage gaps under eccentric shaft action.

Heretofore circumferential shaft seals included a multi-segemented graphitic carbon ring surrounded by a garter spring holding the ring segments in sealing contact with the shaft. A side face of the segmented ring was spring loaded directly against a casing wall in sealing engagement therewith. The seal was therefore effected by the inner periphery and side face of the seal ring. Since the casing was fixedly mounted and the seal ring was thus pressed directly against a fixed wall both by a spring load and by the contained pressure sealed by the assembly, radial movement of the seal ring which might be required to follow the shaft at high speeds is definitely restricted causing a rapid wear of the seal ring and an opening up of leakage paths between the ring segments due to inertia lag or hangup caused by the loaded side face of the ring on a fixed casing wall. The usual method of overcoming this problem was to apply greater spring force on the radial plane to effect tighter closures on the shaft but this caused higher running temperatures and shorter wear life and frequently involved a coking of oil or other material being sealed which further increased the seal wear. Crescent-shaped leakage passages coupled with opened up gaps between the ring segments were always proportional to the shaft runout and in high speed applications it was not unusual to create a clearance gap around the entire interior periphery of the seal joint. Any coking which takes place in the opened up gaps of course prevents contraction of the segments on the shaft with a serious hampering of the sealing efficiency.

According to the present invention the shaft embracing seal ring can be made in one piece since it is floatingly carried in a mounting which can follow shaft runouts thereby eliminating any "hangup" problems such as are encountered when the seal ring is sealed directly against a fixed housing part. The floating mounting of this invention makes possible the use of a one piece split seal ring and a spring loading arrangement which is bottomed in the floating mounting and uniformly exerts a load around the entire circumference of the seal ring regardless of misalignments and shaft runout conditions. The seal system of this invention can be equipped with multi-segment seal rings whenever, for example, installation conditions preclude the mounting of a one piece seal ring around the shaft and the floating mounting feature of the invention will prevent the inertia lags and opening up of leakage gaps such as has been heretofore encountered with garter spring loaded ring segments in fixed housings.

It is then an object of this invention to provide circumferential seals with floating mounting.

Another object of the invention is to provide rotary shaft seals of the circumferential type embodying a shaft riding seal ring supported by a floating carriage effective to absorb shaft runouts.

A further object of this invention is to provide a circumferential shaft seal having a split one piece shaft embracing seal ring.

Another object of this invention is to provide a circumferential shaft seal embodying a seal ring which is radially loaded by a wave spring carried in a floating mounting.

A specific object of the invention is to provide a seal system having a pair of circumferential seal rings floatingly mounted in a single housing.

A still further and more specific object of the invention is to provide a multiple circumferential shaft seal having two shaft engaging split seal rings each carried by a separate mounting in a single housing and urged into side sealing relationship with the housing by a common central spring.

Other and further objects of this invention will be apparent to those skilled in this art from the following detailed description of the annexed sheets of drawings which, by way of preferred examples only, illustrate two embodiments of the invention.

On the drawings:

FIGURE 1 is a side elevational view, with a portion broken away and shown in cross section, of one form of seal assembly according to this invention mounted on a shaft.

FIGURE 2 is a cross sectional view taken along the line II—II of FIG. 1.

FIGURE 3 is a fragmentary cross sectional view taken along the line III—III of FIG. 2.

FIGURE 4 is a diagrammatic view illustrating the maximum available leakage path through the seal of FIGS. 1 to 3 under highly exaggerated shaft runout conditions.

FIGURE 5 is a view similar to FIG. 4 illustrating the leakage paths through a prior art seal under the same exaggerated shaft runout conditions of FIG. 4.

As shown on the drawings:

Figure 6:
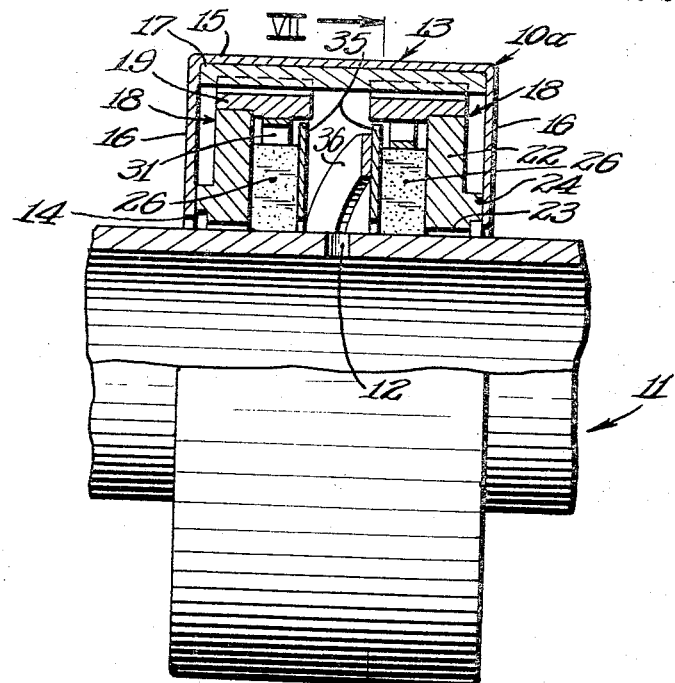
FIGURE 6 is a view similar to FIG. 1 but illustrating a double floating seal according to this invention.

The seal assembly 10 of FIGS. 1 and 2 is shown mounted on a hollow shaft 11 with a port 12 joining the interior of the seal with the interior of the shaft.

The seal 10 includes a metal casing 13 with a central aperture 14 therethrough of larger diameter than the shaft 11 so as to insure a running clearance between the shaft and casing. The casing has a flat cylindrical outer periphery 15 of appreciable width adapted to be tightly pressfitted or otherwise secured in the bore of a housing containing the shaft 11 or from which the shaft 11 projects. The periphery 15 is free from indentations or ledges so that a leakproof pressfit between the casing and housing is readily established. The casing 13 has flat radial side walls 16, 16 extending from the cylindrical periphery 15 to the bore or central aperture 14. The casing is therefore a ring of U-shaped cross section.

Diametrically opposed metal keys 17, 17 traverse the width of the casing 13 and are secured to the inner surface of the periphery 15 thereof.

A floating seal mounting 18 is loosely contained within the casing 13 and includes a metal ring 19 with key slots 20 loosely receiving the keys 17. The ring 19 is of substantially smaller diameter than the periphery 15 of the casing and is of substantially narrower width than the width of the casing so as to be movable both axially and radially within the casing. However, the keys 17 and key slots 20 hold the ring 19 against rotation in the casing without however interfering with the axial and radial movement of the ring. It will be especially noted that substantially the same gap is provided between the bottoms of the key slots and the keys as is provided between the periphery of the ring 19 and the periphery 15 of the casing.

One end of the ring 19 has a counterbore 21 therein into which is pressfitted a metal face ring 22 extending radially inward from the ring 19 to a circular aperture 23 therethrough of larger diameter than the shaft 11 so as to be free of the shaft. The face ring 22 has a raised annular rib or nose 24 for riding on a side wall 16 of the casing near the casing aperture 14. The rings 19 and 22 are fixedly connected so as to move as a unit.

The side of the face ring 22 opposite the nose 24 is flat and smooth to provide a radial sealing face 25.

A one piece split graphitic carbon circumferential seal ring 26 of generally rectangular cross section has a cylindrical inner periphery 27 for riding on the shaft 11, a flat side face 28 for sealingly engaging the face 25 of the ring 22 and a cylindrical outer periphery 29 of substantially smaller diameter than the ring 19. The circumferential seal ring 26 has a split end 30 providing a contraction gap to accommodate snug sealing engagement between the inner periphery 27 of the ring and the outer periphery 11 of the shaft. It will be noted from FIG. 1 that the inner periphery 27 is of smaller diameter than the aperture 23 through the face seal ring 22 so that when the ring 26 embraces the shaft 11 the ring 22 will be free of the shaft.

A split wave spring 31 is positioned between the rings 19 and 26 with the outer convolutions of the spring being bottomed in the ring 19 and the inner convolutions being bottomed on the ring 26 as shown in FIG. 2 and with the ends 32 of the ring being widely spaced to accommodate circumferential contraction of the wave spring.

As shown in FIGS. 2 and 3 the ring 19 has an internal key 33 projecting radially inward between the ends 32 of the wave spring into a keyway 34 in the outer pheriphery of the circumferential seal ring 26. The key 33 and key slot 34 cooperate to prevent rotation of the seal ring 26 relative to the floating mounting 18 but do not interfere with radial or axial movement of the seal ring relative to the mounting.

A flat metal washer 35 is bottomed on the side face of the seal ring 26 opposite the sealing face 28 thereof and extends into the ring 19 in close clearance relationship therewith. The aperture of the washer is substantially larger than the inner periphery 23 of the face ring 22 so as to remain out of contact with the shaft under all operating conditions. A wave spring 36 is compressed between the washer 35 and the adjacent side wall 16 of the casing to axially load the floating carriage 18 so that the nose 24 of the face ring 22 will sealingly ride on the opposite side wall 16 of the casing. The wave spring 36 is of the axially corrugated type while the wave spring 31 is of the radially corrugated type with the spring 31 having a radially contracting function while the spring 36 has an axially expansion function. It will be noted from FIG. 1 that the wave spring 36 holds the seal ring 26 to the right of the port 12 so that the interior of the shaft 11 is vented to the space in the casing upstream from the circumferential seal provided by the seal periphery 27 and the radial seal provided by the nose 24. Pressure vented into this space assists the wave spring 36 in urging the nose 24 against the side wall 16 and of course in urging the seal ring 26 against the face ring 22 and the shaft 11.

In operation the circumferential seal ring 26 rides on the rotating shaft 11 in sealing contact therewith and is held against rotation by the floating carriage 18. At the same time the seal ring 26 is held in sealing contact with the face ring 22 and the nose 24 of this face ring is held in sealing contact with the side wall of the casing. Any radial movement of the shaft relative to the casing 13 due to shaft runout, eccentricities, and the like, is readily accommodated by the floating mounting or carriage 18 for the circumferential seal ring 26. Likewise any cocking or tilting of the shaft relative to the casing is accommodated by this carriage without opening up any leakage path. At the same time these shaft runouts do not in any way change the load of the wave spring 31 on the circumferential seal ring 26 since the spring is carried by the floating mounting. A uniform spring load on the seal ring is insured and as wear of the inner periphery 27 develops this wear will be taken up by the wave spring 31 causing the ring 26 to contract and narrow the gap provided at the split end 30.

If the shaft 11 should develop an eccentric throw-out condition the ring 26, by being carried in the floating mounting 18, is free to follow the shaft in its radial deviations but of course does not rotate with the shaft. Under very high speed conditions where the seal ring 26 cannot recover fast enough to prevent the opening up of a crescent gap between the shaft and ring, the only leakage path from this crescent gap is under the face ring 22 which of course is a continuous ring which cannot open up and may even be bottomed on the shaft in its maximum throwout position. Further since the seal ring 26 is bottomed on this face ring 22 and moves radially therewith as the entire carriage mounting 18 floats there is no inertia lag or hangup which will restrict reclaiming of the crescent gap such as occurs when the seal ring is bottomed against a radially fixed housing part.

Of course the gap 30 between the split ends of the seal ring 26 is closed by a face contact between the face 25 of the face ring 22 and the side face 28 of the seal ring 26.

FIG. 4 illustrates the maximum clearance A that can exist between the inner periphery 23 of the face ring 22 and the shaft 11. Therefore even though the shaft has an eccentricity designated by B which is far greater than anything that would be encountered in use the leakage path under the ring 22 will never be greater than as indicated at A even though a crescent gap G of appreciable extent is opened up between the inner periphery 27 of the seal ring 26 and the shaft 11. The leakage path A is therefore unrelated to the eccentric throw B even though the gap G is related to the eccentric throw B.

FIG. 5 illustrates the leakage paths which are opened up in the prior art seal designated by the reference numeral 40. The seal 40 includes a casing 41 similar to the casing 13 of the seals of this invention and having a side wall 42 against which a three segment graphite carbon circumferential seal ring 43 is urged. The segments 43a, 43b and 43c of this ring 43 are held around the shaft 11 by a garter spring 44 surrounding the ring 43. If the shaft 11 has an eccentric runout B of the same magnitude as illustrated in FIG. 4 the top segment 43c will be widely spaced from the top of the shaft and the crescent leakage path G will be a function of the eccentric throw B. In addition gaps G1 and G2 will be opened up between the segment 43c and the other two segments 43a and 43b. The aperture 45 through the end face 42 of the casing 41 has to be large enough to accommodate any eccentric throw or runout of the shaft 11 so as not to permit the end wall 42 to ride on the shaft and therefore cannot function to restrict the leakage gaps G, G1 and G2. Further since the segment 43c is pressed against the end wall 42 of the casing 41 and since this casing is radially fixed, the segment 43c will hang up on the end wall and the gaps will not be rapidly reclaimed even when the shaft eccentricity is reduced.

Any attempt to use a one piece split seal ring 26 in place of the multi-segmented ring 43 in the seals of the prior art where the circumferential seal ring is pressed directly against a radially fixed casing wall would result in breakage of the graphitic carbon ring because it cannot open up sufficiently to accommodate the eccentric throw of the shaft and it must so open wherever the floating mounting of this invention is not present.

FIGS. 4 and 5 therefore dramatically illustrate the dynamic operating seal conditions of the seals of this invention as compared with the prior art under the same shaft runout environment.

Figure 7:
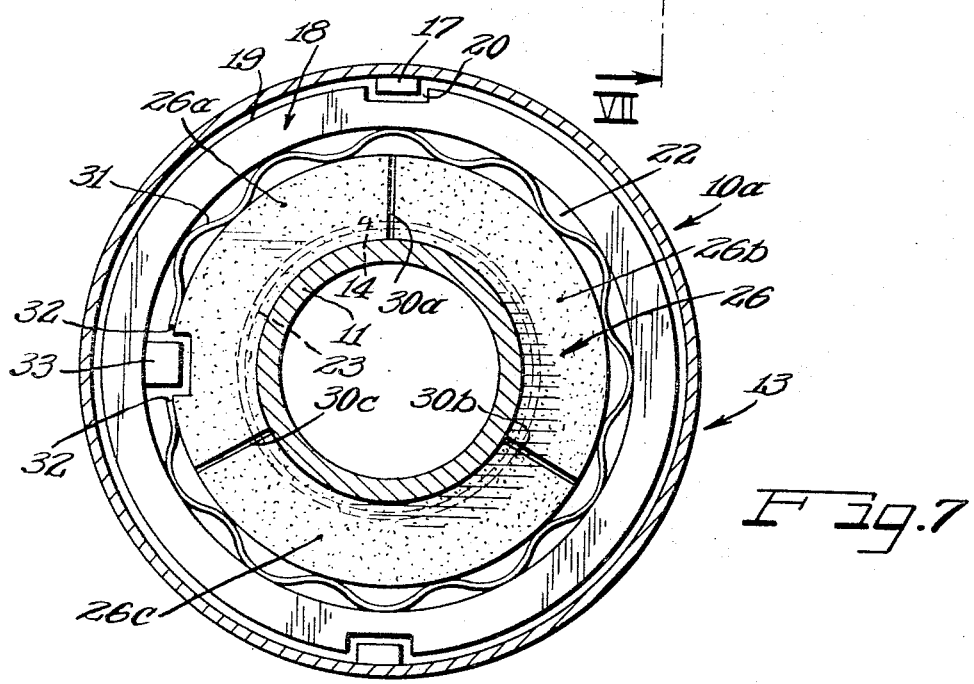
FIGURE 7 is a cross sectional view along the line VII—VII of FIG. 6.

The multiple seal embodiment 10a of this invention shown in FIGS. 6 and 7 is built up of the same components described above in connection with the seal 10 and corresponding parts have been marked with the same reference numerals. The casing 13 of the seal 10a of course is somewhat wider than its counterpart in the seal 10 to accommodate two floating seal mountings or carriages 18. It will be noted from FIG. 6 that a single wave spring 36 serves both floating assemblies 18 and is bottomed on the washers 35 of these assemblies instead of being bottomed on one washer and on a casing side wall 16 as in FIGS. 1 to 3. This spring 36 maintains the seal rings 26 on both sides of the port 12 so that pressure from within the shaft 11 is vented to the space between the floating assemblies and coacts with the spring load 36 to hold the seal rings 26 against the shaft 11 and face rings 22 and the noses 24 of the face rings against the side walls 16. The space between the floating mountings 18 in the seal 10a is sealed and can maintain higher pressures than the corresponding vented space receiving the spring 36 of the seal 10 which space is open through the aperture 14 but even this partly open space can retain some pressure. Both side walls of the casing 16 therefore become sealing faces for the face rings 22. FIG. 7 illustrates wherein the seal ring 26 can be composed of three 120° segments 26a, 26b and 26c with the gaps 30a, 30b and 30c therebetween adding up only to the magnitude of the single gap 30 of the one piece ring 26. The multi-segment ring 26 can be used in those installations where a one piece ring cannot be slipped over the shaft because of some protruding surface or the like. It should be understood however that the one piece ring 26 is preferred since only one gap 30 is thereby provided.

The seal 10a functions in the same manner as described in connection with the seal 10 and has the same limited maximum leakage gap as described in connection with FIG. 4.

From the above descriptions it will therefore be understood that this invention has provided an improved circumferential type seal having dynamic operating capacities far exceeding prior known circumferential seals. The seals of this invention can be highly pressured and can operate at very high temperatures and at high speeds without opening up destructive leakage paths which will permit coking of oil or other lubricant in the leakage gaps such as has been heretofore encountered with attendant decreased wear life.

Although various minor modifications might be suggested by those versed in the art, it should be understood that I wish to embody within the scope of the patent granted hereon all such embodiments as reasonably and properly come within the scope of my contribution to the art.

I claim as my invention:

1. A circumferential shaft seal which comprises an annular casing having opposed side walls with a shaft receiving aperture, a mounting ring loosely fitted in said casing and adapted to move axially and radially in the casing, key and slot means holding the mounting ring against rotation in the casing without impeding radial and axial movement thereof, a face ring carried by said mounting ring and extending radially inward therefrom into close running clearance relation with a shaft to be sealed, said face ring having a laterally projected nose portion for engaging a side wall of the casing and an opposite radial side face, a split carbon seal ring bottomed on said radial face of the face ring and surrounded by said mounting ring, a wave spring between the mounting ring and seal ring effective to contract the seal ring on a shaft to be sealed, key and slot means on the mounting ring and seal ring holding the seal ring against rotation in the mounting ring, and an axial loading spring between the seal ring and adjacent side wall of the casing for urging the seal ring into sealing engagement with the radial face of the face ring while simultaneously urging the nose of the face ring against the opposite side wall of the casing.

2. A circumferential shaft seal which comprises an annular metal casing having a circumferential periphery and inwardly extending radial side walls with a central aperture therethrough adapted to freely receive a shaft to be sealed therein, a rigid mounting ring loosely mounted in said casing to move freely in radial and axial directions therein, key and key slots in the ring and casing holding the ring against rotation in the casing, a radial face ring secured in said mounting ring at one end thereof and extending into close running clearance relationship with a shaft to be sealed, said face ring having a laterally projecting nose portion adapted to ride on one radial wall of the casing and an opposite radial face inwardly from the opposite end of the mounting ring, a graphitic carbon split seal ring within the mounting ring bottomed on said radial face of the face ring, a wave spring between the mounting ring and outer periphery of the seal ring adapted to contract the seal ring into sealing engagement with a shaft to be sealed, said seal ring having an inner periphery of smaller diameter than the inner periphery of the face ring, a washer in said mounting ring overlying said seal ring having close running clearance relation with the mounting ring and having an aperture substantially larger than the face ring, and a second spring between the side wall of the casing and said washer simultaneously urging the seal ring against the radial face of the face ring and the nose of the face ring against the opposite side wall of the casing.

3. A circumferential shaft seal which comprises a casing structure having an outer periphery, side walls and a shaft receiving aperture through the side walls, a seal ring mounting in said casing adapted to shift radially and axially in the casing side face seal means joined to said seal ring mounting, means holding the mounting against rotation in the casing, a contractible shaft embracing seal ring radially within the said mounting, a spring between the ring portion of the mounting and the seal ring for contracting the seal ring around the shaft to be sealed, and a second spring between a side wall of the casing and the seal ring urging the seal ring against the side face seal means and the side face seal means against the opposite side wall of the casing.

4. A multiple shaft seal which comprises an annular casing structure of U-shaped cross-section adapted to receive therethrough a shaft to be sealed, diametrically opposed keys extending across the casing, a pair of mounting rings loosely mounted in the casing having key slots receiving said keys, side face seal rings fitted to said mounting rings and having portions adapted to sealingly engage the opposite side walls of the U-shaped casing, a split graphitic carbon circumferential shaft embracing seal ring surrounded by each mounting ring, springs between the mounting rings and the seal rings contracting the seal rings on the shaft to be sealed, washers covering adjacent faces of the seal rings, and a single spring means between the washers urging the seal rings into sealing engagement with the side face seal rings fitted to the mountings and the side face seal rings into sealing engagement with the side walls of the casing.

5. A circumferential shaft seal which comprises a casing having a peripheral wall and a side wall, a contractible shaft embracing seal ring in said casing, a radially and axially shiftable mounting for said seal ring in said casing, side face seal means attached to said mounting and adjacent the side wall of the casing, said mounting surrounding the said seal ring, a spring between the mounting and the seal ring for contracting the seal ring into sealed engagement around the shaft to be sealed, a second spring urging the seal ring into sealed relation with the side face seal means affixed to said mounting, said side face seal means affixed to the mounting having close running clearance relation with the shaft sealed by the seal ring, and said mounting and said side face seal means being free to move radially with the seal ring under eccentric shaft operating conditions while limiting any leakage path created by expansion of the seal ring under the eccentric throw of the shaft by the close running clearance relationship between the side face seal means affixed to the mounting and the shaft.

6. The seal of claim 5 including key and key slot means in the casing and the mounting accommodating free radial and axial shifting of the mounting and the side face seal means while holding the mounting and the side face seal means against rotation in the casing.

7. The seal of claim 5 including key and slot means in the mounting and the seal ring collaborating to accommodate radial and axial movement of the seal ring relative to the mounting and the side face seal means while holding the seal ring against rotation in the mounting.

8. The seal of claim 3 wherein the seal ring is a split graphitic carbon ring.

9. The seal of claim 3 wherein the seal ring is a multi-segment graphitic carbon ring with gaps between the segments when the ring embraces the shaft to be sealed, whereby the spring between the mounting and the seal ring segments is effective to maintain the segments in sealing engagement with the shaft.

10. A multiple circumferential shaft seal which comprises a casing structure having radial side walls with apertures therethrough accommodating the shaft to be sealed, seal mountings in the casing, side face seals depending from said seal mountings in fixed relation therewith, said mountings being loosely disposed in the casing and accommodating radial and axial shifting movements relative to the casing, a contractible graphite carbon circumferential seal ring surrounded by each of the seal mountings, wave springs between the mountings and the seal rings for contracting the seal rings on the shaft to be sealed, and a spring between the seal rings urging the seal rings against the side face seals and the side face seals against the side walls of the casing, and each of the side face seals having close running clearance relationship with the shaft to be sealed for limiting any leakage path that might be opened up between the seal rings and shaft due to shaft eccentricities.

References Cited
UNITED STATES PATENTS

| | | | |
|---|---|---|---|
| 839,900 | 1/1907 | Sparrow | 277—136 |
| 1,041,534 | 10/1912 | Wagner | 277—136 |
| 2,867,458 | 1/1959 | Kroekel | 277—142 X |
| 2,948,555 | 8/1960 | Wright | 277—26 |
| 3,009,717 | 11/1961 | Laser | 277—26 X |

SAMUEL ROTHBERG, *Primary Examiner.*

UNITED STATES PATENT OFFICE
CERTIFICATE OF CORRECTION

Patent No. 3,333,855                                     August 1, 1967

Raymond H. Andresen

It is hereby certified that error appears in the above numbered patent requiring correction and that the said Letters Patent should read as corrected below.

In the heading to the printed specification, line 4, for "a corporation of Illinois" read -- a corporation of Delaware --

Signed and sealed this 29th day of October 1968.

(SEAL)
Attest:

Edward M. Fletcher, Jr.                           EDWARD J. BRENNER

Attesting Officer                                         Commissioner of Patents